United States Patent [19]

Chao-I

[11] Patent Number: 5,161,569
[45] Date of Patent: Nov. 10, 1992

[54] WATER SUPPLY DEVICE FOR A DRINKING FOUNTAIN

[76] Inventor: Tseng Chao-I, No. 6, Alley 6, Lane 450, Sec. 6 Chung Shan N. Rd., Taipei, Taiwan

[21] Appl. No.: 859,204

[22] Filed: Mar. 27, 1992

[51] Int. Cl.⁵ .............................................. F16K 31/24
[52] U.S. Cl. ..................................... 137/448; 137/434
[58] Field of Search ............... 137/434, 442, 443, 444, 137/448

[56] References Cited

U.S. PATENT DOCUMENTS

| | | | |
|---|---|---|---|
| 1,489,403 | 4/1924 | Wasdell | 137/448 |
| 1,576,600 | 3/1926 | Haas | 137/434 |
| 2,263,142 | 11/1941 | Pratt | 137/448 |
| 3,094,138 | 6/1963 | Sprouse | 137/448 |
| 4,194,525 | 3/1980 | Struckman et al. | 137/443 |
| 4,586,532 | 5/1986 | Tsolkas | 137/448 |
| 4,590,960 | 5/1986 | Koble, Jr. | 137/443 |

*Primary Examiner*—George L. Walton
*Attorney, Agent, or Firm*—Lowe, Price, LeBlanc & Becker

[57] ABSTRACT

A water supply device comprising a water stop cock controlled by a float bowl to stop or open a water discharge pipe for guiding a supply of water from an external water supply source to the water intake piping of a drinking fountain upon the using up of the water contained in the water tank of said drinking fountain.

1 Claim, 5 Drawing Sheets

WATER SUPPLY DEVICE FOR A DRINKING FOUNTAIN

BACKGROUND OF THE INVENTION

The present invention relates to a water supply device for providing a supply of water from an external water supply source to a drinking fountain automatically upon the using up of the water in the water tank thereof.

In using a drinking fountain, the water tank must be frequently filled with city water before its using up. If the water tank of a drinking fountain is kept empty, the internal electric circuit of a drinking fountain may be burnt out. The present invention has been accomplished to eliminate these problems. It is therefore the main object of the present invention to provide a water supply device for a drinking fountain which can automatically guide a supply of city water into a drinking fountain before the using up of the water in the water tank of a drinking fountain.

SUMMARY OF THE INVENTION

According to the present invention, there is provided a water supply device for a drinking fountain which is generally comprised of a mounting frame secured to the covering shell of a drinking fountain, a hollow connecting bar fastened in two opposite square holes on said mounting frame, a connector to connect a water discharge pipe to a bottom bolt hole on said connecting bar, a water intake pipe connected to an end bolt hole on said connecting bar by a lock bolt, and a link pivoted to said mounting frame to hold a water stop cock and a float bowel, and wherein said water stop cock is released from said water discharge pipe to let a supply of water from said external water supply source to flow therethrough into the water intake piping of a drinking fountain when the water in the water tank of said drinking fountain is used up; said water stop cock is lifted by said float bowel to stop said water discharge pipe when the water tank of said drinking fountain is contained with water.

DETAILED DESCRIPTION OF THE PREFERRED EMBODIMENT

Figure 1:
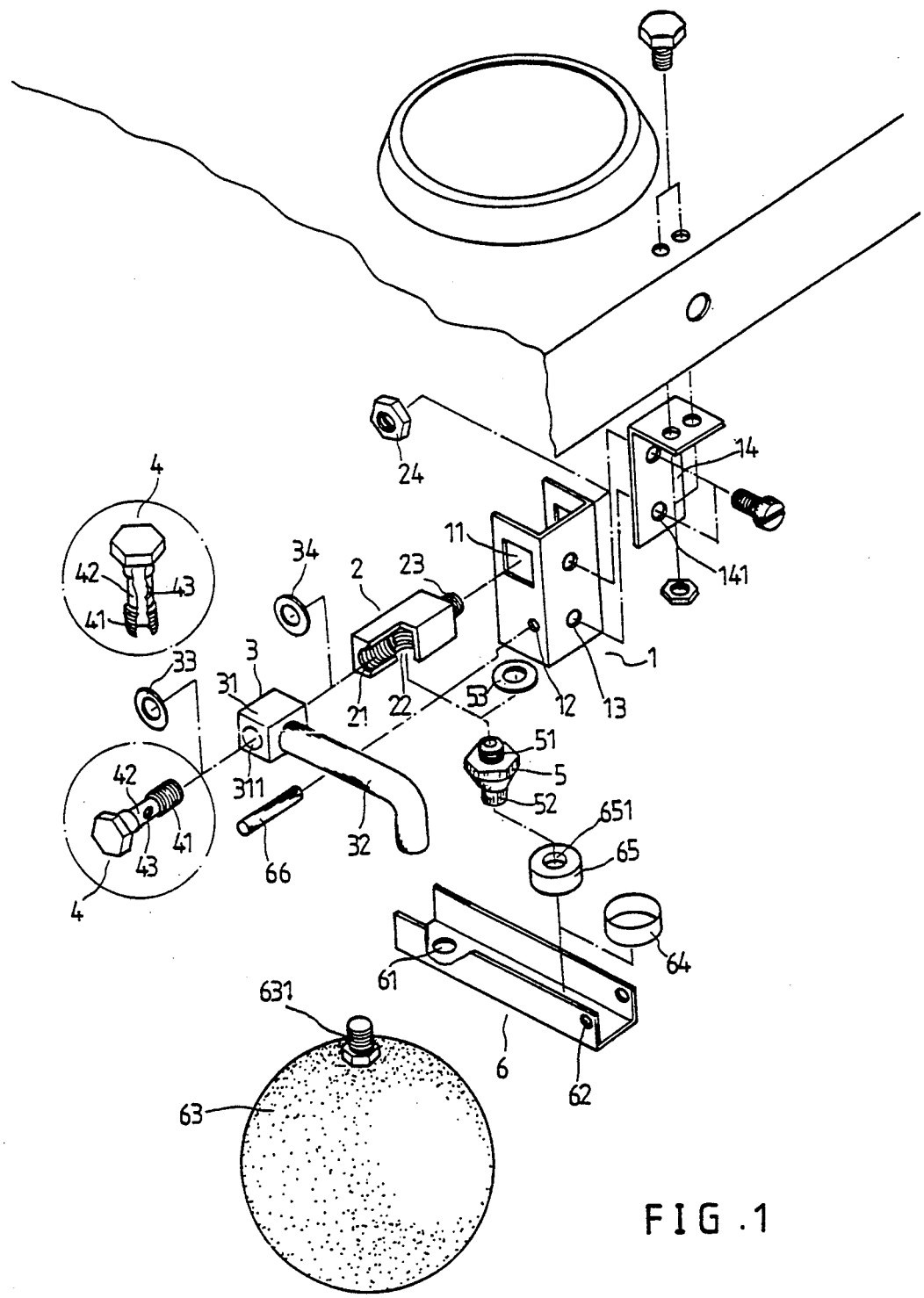
FIG. 1 is an exploded view of the preferred embodiment of the water supply device of the present invention.
Figure 2:
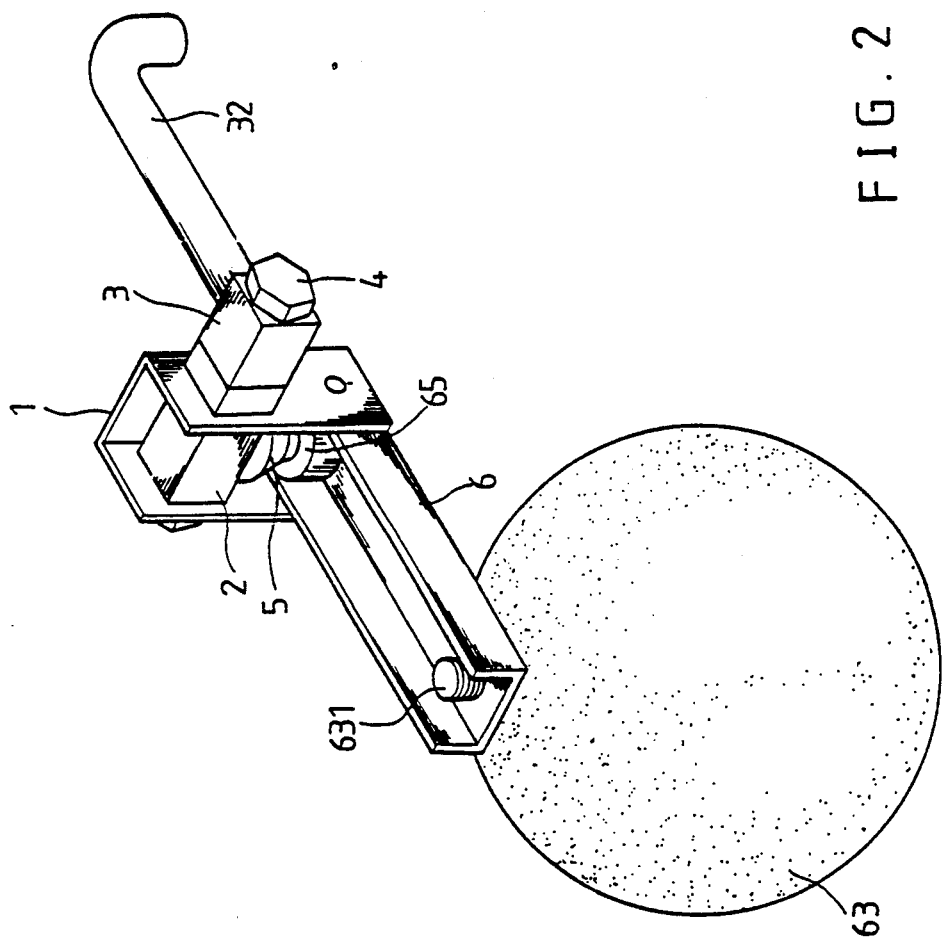
FIG. 2 is a perspective view of preferred embodiment of the water supply device of the present invention.

Referring to FIGS. 1 and 2, a water supply device is generally comprised of a mounting frame 1, a connecting bar 2, a guide tube assembly 3, a lock bolt 4, a connector 5, and a link 6. The mounting frame 1 is made from a channel bar having two square holes 11 and two pin holes 12 on two opposite side walls thereof, and two bolt holes 13 on a base wall thereof for fastening to the covering shell of a drinking fountain by a substantially L-shaped connecting plate 14. The connecting plate 14 has through holes 141 corresponding to the bolt holes 13 on the mounting frame 1 for fastening screws and nuts. The connecting bar 2 has a first bolt hole 21 at one end, a second bolt hole 22 on a bottom edge thereof connected to the first bolt hole 21 at a right angle, and a screw rod 23 at an opposite end. The connecting bar 2 is fastened in the square holes 11 on the mounting frame 1 with the screw rod 23 thereof locked by a lock nut 24. The guide tube assembly 3 comprises a metal block 31 having a water intake pipe 32 connected thereto at one side. The metal block 31 has a through hole 311 connected with the water intake pipe 32 at a right angle and attached with two gasket rings 33, 34 at two opposite ends. The lock bolt 4 has an outer thread 41 at one end, a circular, smooth rod portion 42 at the middle, and a round hole 43 on the circular, smooth rod portion 42. By inserting the outer thread 41 of the lock bolt 4 through the gasket ring 33, the through hole 311 and the gasket ring 34 into the first bolt hole 21 on the connecting bar 2, the guide tube assembly 3 is secured to the connecting bar 2. The connector 5 is a hollow connector having a hollow screw rod 51 upstanding from a top edge thereof, and a stub tube 52 vertically extending downwards from a bottom edge thereof. By inserting the hollow screw rod 51 through a gasket ring 53 into the second bolt hole 22 on the connecting bar 2, the connector 5 is secured to the connecting bar 2.

The link 6 is made from a channel bar having a bolt hole 61 at one end, two opposite pin holes 62 at an opposite end secured to the pin holes 12 by a pin 66, a float bowl 63 secured to the bolt hole 61 by a screw rod 631, a water cock holder 64 fixeldy fastened thereto at a suitable location, a water stop cock 65 fastened inside the water cock holder 64. The water stop cock 65 has a recessed round hole 651 releasably stopped at the stub tube 52 of the connector 5.

Figure 3:
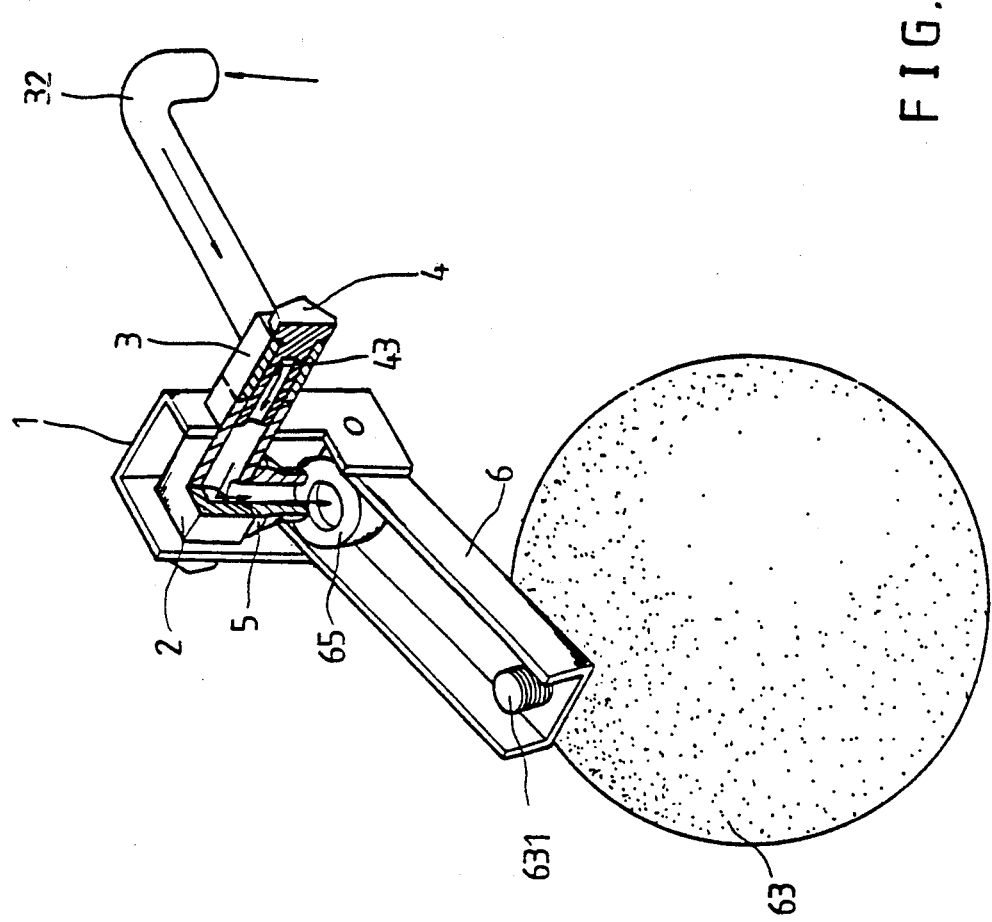
FIG. 3 is a partly sectional view of the water supply device showing the flowing direction of a supply of city water upon the opening of the water stop cock thereof.
Figure 4:
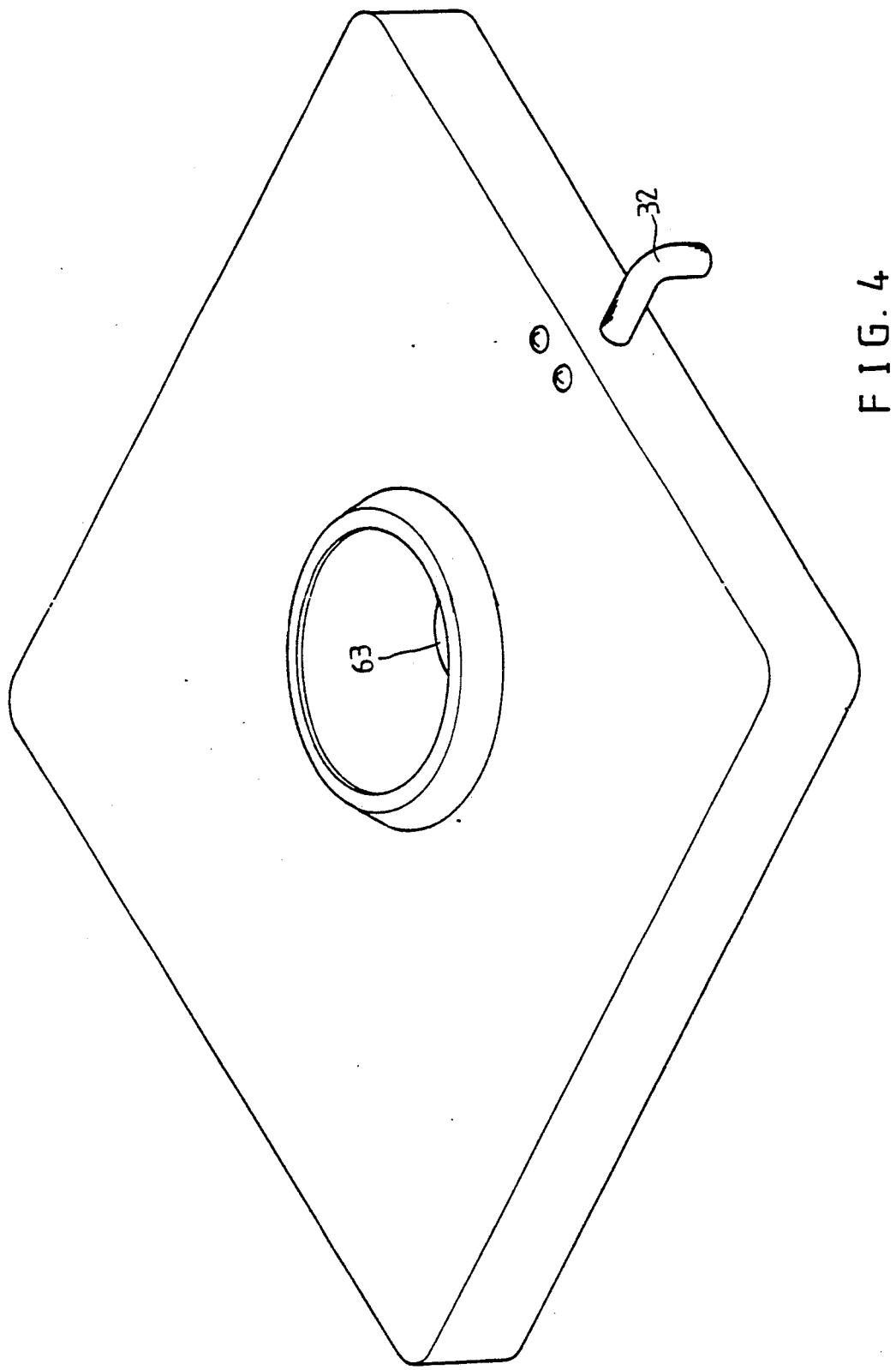
FIG. 4 is an elevational view of a drinking fountain's covering shell in which the water supply device is installed.
Figure 5:
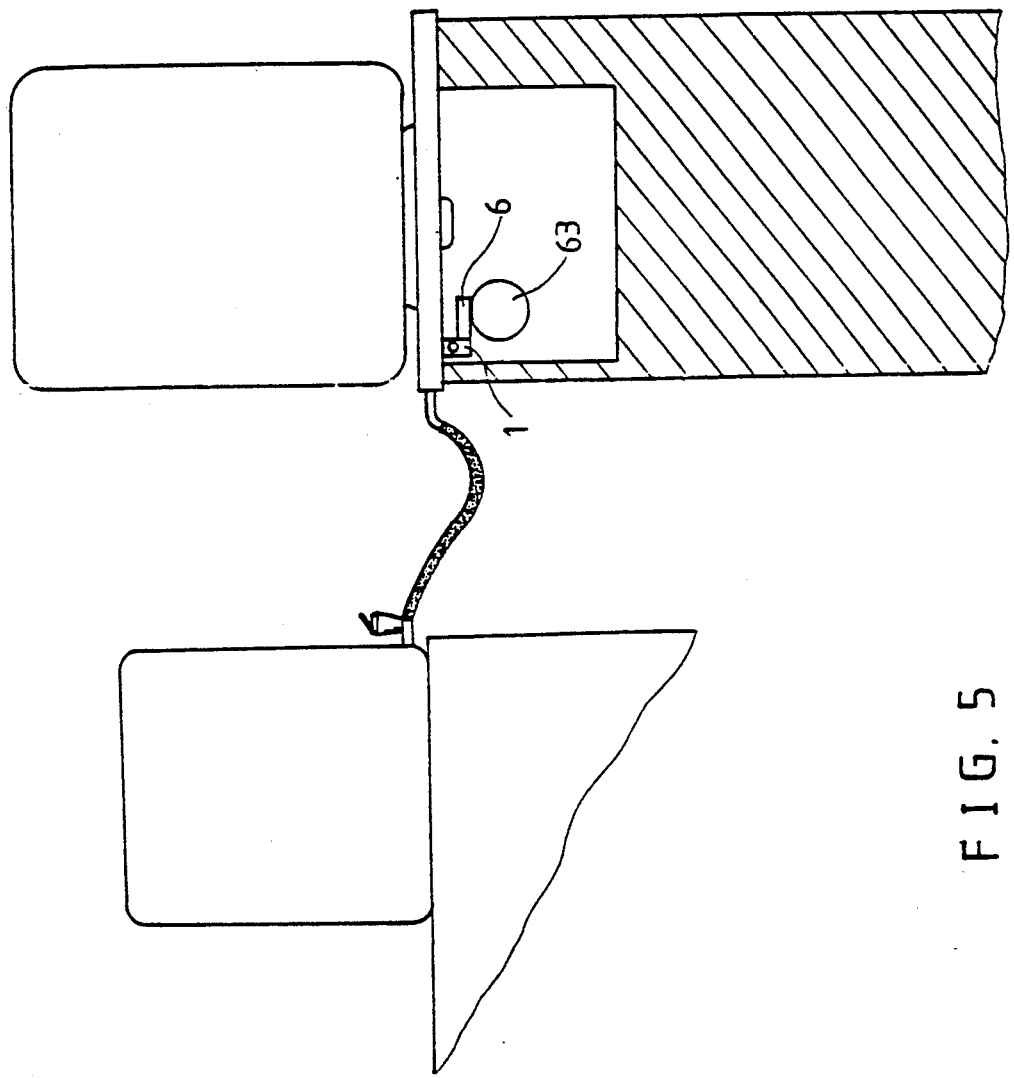
FIG. 5 is a plan view showing that the water supply device is connected to an external water supply source.

Referring to FIGS. 3, 4 and 5, the water supply device is to be fastened in a drinking fountain with the float bowl 63 disposed in the water intake piping from the water tank thereof and, with the water intake pipe 32 connected to a city water supply or an external water supply source. Therefore, the float bowel 63 will follow the water level to move up and down causing the water stop cock 65 to stop at or release from the stub tube 52. Once the water stop cock 65 is released from the tub tube 52, a supply of water will be guided through the water intake pipe 32, the metal block 31, the round hole 43, the first bolt hole 21 and the second bolt hole 22 into the connector 5 and then, discharged through the stub tube 52 into the water intake piping of the water tank.

What is claimed is:

1. A water supply device for guiding a supply of water from an external water supply source to the water intake piping of a drinking fountain, the device comprising:

a mounting frame connected to the covering shell of a drinking fountain, said mounting frame having two square holes and two pin holes on two opposite side walls thereof, the two bolt holes on a base wall thereof for connecting a connecting plate by screws and nuts, said connecting plate being fastened to the covering shell of said drinking fountain;

a connecting bar fastened in said square holes on said mounting frame, said connecting bar having a first bolt hole longitudinally disposed at one end, a second bolt hole on a bottom edge thereof connected to said first bolt hole at a right angle, and a screw rod at an opposite end secured to either square hole on said mounting frame by a lock unit;

a guide tube assembly secured to said connecting bar at one end, said guide tube comprising a metal block having a water intake pipe secured thereto, said water intake pipe being connected to an external water supply source, said metal block having a through hole connected with said water intake pipe at a right angle and secured to said first bolt hole on said connecting bar by a lock bolt, said lock bolt having an outer thread at one end inserted through the through hole on said metal block and screwed into said first bolt hole, and a round hole aligned with said second bolt hole;

a connector connected to said second bolt hole on said connecting bar, said connector having a hollow screw rod upstanding from a top edge thereof screwed into said second bolt hole on said connecting bar, and a water discharge pipe vertically extending downwards from a bottom edge thereof and aligned with the hollow screw rod thereof;

a link pivotably secured to said mounting frame, said link having a bolt hole at one end with a float bowel secured thereto by a screw rod, two opposite pin holes at an opposite end secured to the two pin holes on said mounting frame by a pin, a water cock holder on a top surface thereof, a water stop cock fastened inside said water cock holder; and wherein said water stop cock is released from said water discharge pipe to let a supply of water from said external water supply source to flow therethrough into the water intake piping of a drinking fountain when the water in the water tank of said drinking fountain is used up; said water stop cock is lifted by said float bowel to stop said water discharge pipe when the water tank of said drinking fountain is contained with water.

* * * * *